UNITED STATES PATENT OFFICE.

FRITS E. STOCKELBACH, OF NEW YORK, N. Y., ASSIGNOR TO COMMONWEALTH CHEMICAL CORPORATION, OF NEW YORK, N. Y., A CORPORATION OF NEW JERSEY.

PROCESS OF COLLOIDING CARBOHYDRATE ESTERS AND PRODUCTS THEREOF.

1,370,853. Specification of Letters Patent. Patented Mar. 8, 1921.

No Drawing. Application filed July 23, 1920. Serial No. 398,388.

*To all whom it may concern:*

Be it known that I, FRITS E. STOCKELBACH, a subject of the King of Denmark, and having declared his intention to become a citizen of the United States of America, residing at New York, in the county of New York and State of New York, have invented a certain new and useful Improvement in Processes of Colloiding Carbohydrate Esters and Products Thereof, of which the following is a full, clear, and exact description.

This invention relates to the manufacture of celluloids or of solutions of cellulose esters and of products and objects of various kinds made therefrom.

The object of the invention is to provide plastic solvents or colloiding agents in the manufacture of celluloids or solutions of cellulose esters and products and objects made therefrom.

Fundamentally the invention consists in the colloiding of esters formed from aromatic alcohols or homologues or substitution products thereof and inorganic acids with carbohydrate esters, and particularly the nitrates of cellulose, in the manner and for the purpose hereinafter explained and finally claimed.

By "aromatic alcohols" I mean any alcohol derived from aliphatic alcohols by substitution of one or more hydrogen atoms with an aryl group. As an example of such aryl substituted alcohols I may mention benzyl-alcohol.

In general, my invention comprises the use, as a colloiding agent, of phosphoric acid esters of benzyl-alcohol or substituted benzyl-alcohols or homologues of same.

By "substituted benzyl-alcohols" I mean such bodies as chlor-benzyl-alcohol, hydroxyl-benzyl-alcohol and the like. By "homologues" of benzyl-alcohol or substituted benzyl-alcohols, I mean such bodies as tolyl-alcohol, chlor-tolyl-alcohol and the like.

As a concrete example of such a plastic solvent or colloiding agent used in the manufacture of celluloid, I may mention tri-benzyl-phosphate, which is an ester having the following formula:—

I am aware that phenol-esters or compound ethers of inorganic acids, such as tri-phenyl-phosphate, or tri-cresyl-phosphate, have been described as colloiding agents of carbohydrate esters, but these compounds are not as stable as the esters formed of genuine alcohols, such as benzyl-alcohol with phosphoric acid.

All phenol-esters whether of inorganic acids or of organic acids are apt to discolor when exposed to light, and would therefore discolor the celluloid or other product in which they were used as solvents or colloiding agents, whereas this is not the case with inorganic esters of aromatic alcohols.

As an illustrative example of the invention, as applied to the manufacture of celluloid, I may mix 75 parts of nitro-cellulose with 25 parts of tri-benzyl-phosphate, or with 10 parts of tri-benzyl-phosphate and 15 parts of camphor, and the solution or colloiding may be assisted by the addition of other low boiling point solvents, such, for instance as acetone, ethyl-alcohol, chloroform, benzol and the like in varying proportions.

As previously mentioned, the compounds formed from cellulose esters with the aid of tri-benzyl-phosphate as the colloiding agent do not discolor when exposed to light, and they are very much less inflammable than other compounds made from cellulose esters with the aid of camphor or phenyl and cresyl compounds of organic acids as colloiding agents.

As a colloiding agent in the manufacture of celluloid, camphor is usually employed, but on account of its volatile nature and the great inflammability when used alone, it is not used to the same advantage as the colloiding agents employed in my invention, whether these be used alone or in conjunction with camphor.

As the boiling point of tri-benzyl-phosphate lies over 300° C., it has a marked advantage over camphor, as it does not volatilize during the process of colloiding.

While I have described my invention in detail it is to be understood that variations may be made within the principle thereof and the scope of the claims hereinafter made.

What I claim is:—

1. The process which comprises colloiding a carbohydrate ester with a phosphoric ester of one of the homologous series of aromatic alcohols of which benzyl-alcohol is a member.

2. The process which comprises colloiding a cellulose nitrate with an ester formed from an aromatic alcohol and an inorganic acid.

3. The process which comprises colloiding a carbohydrate ester with tri-benzyl-phosphate.

4. The process which comprises colloiding a cellulose nitrate with tri-benzyl-phosphate.

5. The process which comprises colloiding a carbohydrate ester with a liquid comprising a phosphoric ester of one of the homologous series of aromatic alcohols of which benzyl-alcohol is a member.

6. The process which comprises colloiding a cellulose nitrate with a liquid comprising tri-benzyl-phosphate.

7. The process which comprises colloiding a carbohydrate ester with a liquid comprising a phosphoric ester of one of the homologous series of aromatic alcohols of which benzyl-alcohol is a member, and a volatile solvent.

8. The process which comprises colloiding a cellulose nitrate and a liquid comprising tri-benzyl-phosphate and a volatile solvent.

9. The process which comprises colloiding a carbohydrate ester with a liquid comprising a phosphoric ester of one of the homologous series of aromatic alcohols of which benzyl-alcohol is a member, camphor and a volatile solvent.

10. The process which comprises colloiding a cellulose nitrate with a liquid comprising tri-benzyl-phosphate, camphor and a volatile solvent.

11. The process which comprises colloiding a carbohydrate ester with a liquid comprising a phosphoric ester of one of the homologous series of aromatic alcohols of which benzyl-alcohol is a member and a volatile solvent, and finally by removing the volatile solvent.

12. The process which comprises colloiding a cellulose nitrate with a liquid comprising tri-benzyl-phosphate and a volatile solvent, and removing the volatile solvent.

13. The process which comprises colloiding a carbohydrate ester with a liquid comprising a phosphoric ester of one of the homologous series of aromatic alcohols of which benzyl-alcohol is a member, camphor and a volatile solvent, and removing the volatile solvent.

14. The process which comprises colloiding a cellulose nitrate with a liquid comprising tri-benzyl-phosphate, camphor, and a volatile solvent, and removing the volatile solvent.

15. A composition comprising a carbohydrate ester and a phosphoric ester of one of the homologous series of aromatic alcohols of which benzyl-alcohol is a member.

16. A composition comprising a cellulose nitrate and a phosphoric ester of one of the homologous series of aromatic alcohols of which benzyl-alcohol is a member.

17. A composition comprising a carbohydrate ester and tri-benzyl-phosphate.

18. A composition comprising a cellulose nitrate and tri-benzyl-phosphate.

19. A composition comprising a carbohydrate ester, tri-benzyl-phosphate and camphor.

20. A composition comprising a cellulose nitrate, tri-benzyl-phosphate and camphor.

21. A composition comprising a carbohydrate ester, a phosphoric ester of one of the homologous series of aromatic alcohols of which benzyl-alcohol is a member, and camphor.

22. A composition comprising a cellulose nitrate, a phosphoric ester of one of the homologous series of aromatic alcohols of which benzyl-alcohol is a member, and camphor.

In testimony whereof I have hereunto set my hand this 19th day of July A. D. 1920.

FRITS E. STOCKELBACH.

Witnesses:
JOHN T. McGOVERN,
G. C. PLUMB.